United States Patent [19]

Silva et al.

[11] Patent Number: 5,120,561
[45] Date of Patent: Jun. 9, 1992

[54] FOOD COMPOSITION AND METHOD

[75] Inventors: Roy F. Silva, Norwalk, Conn.; Joseph Fierro, Greenwood Lake; Jeannie Buccino, Yonkers, both of N.Y.; Heinz Jodlbauer, Hanover, Fed. Rep. of Germany

[73] Assignee: American Lecithin Company, Danbury, Conn.

[21] Appl. No.: 691,357

[22] Filed: Apr. 25, 1991

[51] Int. Cl.⁵ ............................................. A23L 1/30
[52] U.S. Cl. .................................. 426/531; 426/549; 426/662
[58] Field of Search .................. 426/662, 531, 549

[56] References Cited

U.S. PATENT DOCUMENTS

| | | |
|---|---|---|
| 3,023,104 | 2/1962 | Battista . |
| 3,573,058 | 3/1971 | Tiemstra . |
| 4,103,037 | 7/1978 | Bodor et al. ........................ 426/575 |
| 4,305,964 | 12/1981 | Moran et al. ........................ 426/99 |
| 4,305,970 | 12/1981 | Stone, Jr. ............................. 426/653 |
| 4,425,276 | 1/1984 | Gunther ............................. 260/403 |
| 4,443,378 | 4/1984 | Gunther ............................. 260/403 |
| 4,452,742 | 6/1984 | Stawitz ............................... 260/367 |
| 4,515,825 | 5/1985 | Moran et al. ....................... 426/603 |
| 4,684,526 | 8/1987 | Knightly ............................. 426/19 |
| 4,734,287 | 3/1988 | Singer et al. ........................ 426/41 |
| 4,874,553 | 10/1989 | Hager et al. ....................... 260/403 |
| 4,911,946 | 3/1990 | Singer et al. ....................... 426/658 |
| 4,999,208 | 3/1991 | Lengerich et al. ................. 426/549 |
| 5,009,819 | 4/1991 | Popescu et al. ..................... 264/4.1 |
| 5,015,483 | 5/1991 | Haynes et al. ................... 426/603 X |

OTHER PUBLICATIONS

"Phospholipids as Natural Surfactants for the Cereal Industry", 10-90. Roy Silva, *Cereal Foods World*.
"Liposomes from Soya Phosphilipids as Percutaneous Drug Carriers" Artmann, Roding, Ghyczy and Pratzel, Arzneim-Forsch/Drug Res. 40 (II) Nr. 12 pp. 1363-1365 (1990).
"Significance of Empty Liposomes Alone and as Drug Carriers in Dermatology", Gehring, Ghyczy, Gloor, Heizler and Roding, Arznein-Forsch/Drug Res. 40 (II) Nr. 12, pp. 1368-1371 (1990).
"Characterization of Liposomes and Natipide II System" J. Roding May 5, 1990, Presentation held at the workshop Liposomes and Skin May 12, 1990, Paris.
"Natipide II: New Easy Liposome System", J. Roding Mar. 16, 1990, Lecture held at In-Cosmetics, Mar. 6-8, 1990, Birmingham.
"The Indistrial Uses of Special Lecithins: A Review" W. Nieuwenhuyzen, Oct. 1981, JAOCS.
Nathin Technical Bulletin, 122-130-135-140-150 (Fluid) Natterman Phospholipid, Inc., Danbury, CT.

*Primary Examiner*—Joseph Golian
*Attorney, Agent, or Firm*—Daniel J. Donovan; Paul J. Juettner; John A. Shedden

[57] ABSTRACT

The invention provides a food additive prepared from refined and fractionated phospholipids containing at least 35% phosphatidyl choline and a ratio of 2:1 to 10:1 phosphatidyl choline to phosphatidyl ethanolamine which is complexed with water and vigorously mixed to form globular vesicles or liposomes. The aqueous liposomes are then used per se or mixed with food ingredients and/or with an edible reinforcing carbohydrate to form a suspension or paste which is added to the foodstuff. The liposome can replace some or all of the fat in the food as well as acting as a carrier, encapsulating agent, moisturizing agent, and depanner for foods.

10 Claims, No Drawings

FOOD COMPOSITION AND METHOD

The present invention relates to food products containing liposomes and particularly materials to be used as replacements for fat and their methods of preparation. The fat replacements can be used in any system where the fat is contained in the food and are particularly useful in baking. The product of the present invention is prepared by forming liposomes or globular vesicles which when combined with food allow reduction or removal of substantially all the fat in a food and its replacement with the product of this invention.

Natural surfactants such as lecithin are popular with the consumer and used in many foods but often have only moderate functionality.

Crude lecithins are mixtures of phospholipids each of which have characteristic surface activity. As with the triglycerides, glycerol is esterified with saturated or unsaturated fatty acids in the $C_1$ and $C_2$ positions. The third carbon atom is esterified with phosphoric acid to give phosphatidic acid. When the phosphoric acid in turn is esterified with an alcohol-like choline, there is obtained phosphatidyl choline, also known chemically as "lecithin" and when esterified with ethanolamine, there is obtained phosphatidyl ethanolamine, also known as cephalin.

The ranges of the major phospholipids in deoiled soybean lecithin are as follows: phosphatidyl choline 29-39% phosphatidyl ethanolamine 20-26%, phosphatidyl inositol 13-17.5%, and glycolipid 14-15% . Soybean lecithin is thus not a standardized product and can give varying functionality.

Differences in solubilities are utilized to facilitate the initial separation of crude lecithin phospholipids. The resulting fractions are then chromatographically purified to give refined lecithin phospholipids. As disclosed in U.S. Pat. No. 4,425,276 issued Jan. 10, 1989 and U.S. Pat. No. 4,452,742 issued Jun. 5, 1989; crude lecithin can now be fractionated in various ways to concentrate certain phospholipids, eliminate others, or form unique blends. For example, where the standard proportion of phosphatidyl choline to phosphatidyl ethanolamine in crude lecithin is 1.2:1, the ratio can be changed to 2:1 or more. For further information see Silva, *Cereal World*, vol. 35, No. 9, pages 1008-1012, Oct. 05, 1990.

Liposomes are microscopically small, hollow phospholipid spheres, which can be composed of one or several concentrically arranged phospholipid double membranes. Liposomes can be loaded with a variety of substances. Lipophilic active substances dissolve in the bilayer, amphiphilic substances become associated with the phospholipid membrane and hydrophilic substances occur in solution in the enclosed aqueous volume. "Liposomes from Soya Phospholipids as Percutaneous Drug Carriers", Artmann, Röding, Ghyczy and Pratzel, Arzneim-Forsch/Drug Res. 40 (II) Nr. 12 pp. 1363-1365 (1990). Liposomes used as drug carriers or for topical cosmetic use are non-toxic and available in industry. "Significance of Empty Liposomes Alone and as Drug Carriers in Dermatotherapy", Gehring, Ghyczy, Gloor, Heizler and Röding, Arzneim-Forsch/Drug Res. 40 (II) Nr. 12, pp. 1368-1371 (1990). Often liposomes are distinguished by their number of lamellae and size. Small unilamellar vesicles are surrounded by one membrane and have diameters of 20 nm to 100 nm while large unilamellar vesicles range up to one micron. Multilamellar vesicles consist of several concentric membrane layers and range up to several microns. Presentation by J. Röding at workshop "Liposomes and Skin" May 5, 1990 Paris entitled "Characterization of Liposomes and Natipide ® II System".

In the past natural lecithin and chemically modified lecithins have been used as ingredients in food, generally for their surface active or emulsifying properties. In some cases, lecithin or phospholipids have been combined with food materials designed to replace some fat in the food systems. For example: U.S. Pat. No. 4,684,526 "Antistaling/Conditioning Agent in Producing Bakery Products" issued Aug. 4, 1987 to Knightly teaches a hydrophillic lecithin. The lecithin used is treated to reduce the hydrophobic character of certain of its components leaving a fraction with enhanced hydrophillic character. Specifically lecithin is chemically reacted or hydrolyzed to enhance its hydrophillic character. The material is used for its antistaling and conditioning properties in baked products.

A review of the industrial use of special lecithins is given by Niemwenhuyzen, W.V., *Industrial Uses of Special Lecithins*.

U.S. Pat. No. 4,305,964, "Food Product", issued Dec. 15, 1981 to Moran et al., teaches dispersed aqueous gelled beads of average diameter of 5-10 up to 100 microns prepared from proteins, grains or starch and which are coated with lipophillic material, e.g. phospholipides and/or edible triglyceride fat.

U.S. Pat. No. 4,305,970, "Edible Emulsions and Process for their Preparation", issued Dec. 15, 1981 to Moran, teaches similar products. See also U.S. Pat. No. 4,515,825 to Moran et al. for similar low fat spreads.

U.S. Pat. No. 3,023,104, "Food Compositions Incorporating Cellulose Crystallite Aggregates" issued Feb. 27, 1962 to Battista teaches cellulose gels having aggregates of one micron or less to reduce calories while U.S. Pat. No. 3,573,058 "Microcrystalline Cellulose Compositions Co-Dried with Hydrocolloids", issued Mar. 30, 1971 to Tiemstra, teaches fine cellulose coated with hydrocolloids. U.S. Pat. No. 4,103,037, "Low Fat Spread", issued Jul. 25, 1978 to Bodor et al, teaches protein particles of no more than 5 microns used to make a low fat spread of an aqueous protein in fat.

U.S. Pat. No. 4,911,946 "Carbohydrate Cream Substitute", issued Mar. 27, 1990 to Singer et al, teaches a water dispersible macro colloidal particle effective to impart characteristic of oil in water emulsions. The carbohydrates include starches with lecithin and xanthan used to stabilize the colloidal particles and prevent aggregation. This work is similar to earlier work disclosed in U.S. Pat No. 4,734,287 to Singer et al, which employed dairy whey protein fat substitute which did not work in baked goods.

To our knowledge, liposomes have not been used in foods or for food uses.

While size reduction of certain starches, proteins and grains are known to simulate fat, the lecithin and chemically modified lecithin employed in these prior art fat reduced formulations are employed for their normal emulsifying properties and not to reduce the fat content of the food.

SUMMARY OF THE INVENTION

We have found that phospholipid liposomes have great utility in foods to replace fat, to act as carriers or encapsulating agents for food ingredients such as colors, vitamins, flavors and the like, to act as depanners and to provide improved moisture retention in foods as well as many other uses.

We have found that phosphatidyl choline and phosphatidyl ethanolamine form vesicles or liposomes which can replace at least part of the fat in foodstuffs per se and where the vesicles or liposomes are combined with an edible reinforcing material according to the method of this invention may replace substantially all the fat in food systems.

We have found that the vesicles or liposomes employed in this invention must be formed first before addition to the food. It is necessary to treat the phospholipid with water and mechanical force to change the phospholipid bilayer into multilamellar or unilamellar vesicles or liposomes to which can be added the material being encapsulated or the reinforcing material. This hydrated material can then be added directly to the food to replace up to 60% of the fat contained therein. Preferably however, we add an edible carbohydrate reinforcing material to the aqueous mixture of vesicles or liposomes and mix until a paste or suspension is formed. This paste can be added to the food to replace all of the fat normally contained in the food. Surprisingly, we have found that often less of our fat replacement product, by weight, is necessary than the fat replaced in making totally fat free products. The fat replacement product is particularly useful in baking where other fat substitutes or fat mimentics do not work.

DETAILED DESCRIPTION OF THE INVENTION

We have found that the addition of phospholipid liposomes to food is highly beneficial. Vitamins, minerals, flavors and the like can be incorporated and protected in the foodstuff. The liposomes offer a means of retaining moisture in the food as well as replacing all or some of the foods fat content.

It is necessary to hydrate the phospholipid with water and mechanically mix the combination to form unilamellar or multilamellar liposomes. The greater the mechanical (or shearing) agitation the better the formation of stable liposomes prior to addition to the food. The liposome may then be stabilized by the addition of from 0.25 to 4.0 parts of mono or disaccharide or by other known stabilizing techniques. Reinforcing material can then be added to the system. Vitamins, flavors and other food additives may be added prior to or in conjunction with the addition of stabilizing or reinforcing material.

We have found that all of the fat normally contained in food can be replaced with a mixture of hydrated phospholipid globular vesicles or liposomes which are combined with an edible carbohydrate reinforcing material to form a stable paste or suspension which can be directly substituted for fats used in formulating foods. Many times, normal ingredients of the food will include one or more of the edible reinforcing agents used herein and can be combined first with the vesicles or liposome prior to incorporation in the food.

The fat substitute of this invention can be prepared by vigorously mixing with water at least 5% (by weight of water) of a refined phospholipid to form hydrated globular vesicles or liposomes of the phospholipid. Carbohydrate is then added to this mixture and mixed to form a paste or suspension which doesn't separate prior to use. When used to replace fat in a bakery formula we have found we can bake equivalent or better products using the same amount or less of our fat replacer material on a weight to weight basis. The fat replacer may also be used in other foods including normally fat containing coatings, in salad dressings, and various milk products including ice cream, yogurt and cheese, in bakery products and cereals and any prepared fat containing food product. It is particularly preferred to use the fat replacers in baked products including cereals, brea, cake, cookies, danish and the like.

We have found that the refined phospholipid may contain at least 35%, preferably at least 40% phosphatidyl choline and the phosphatidyl choline should be present in a ratio of at least two parts of phosphatidyl choline to each part of phosphatidyl ethanolamine. Preferably the ratio of phosphatidyl choline to the phosphatidyl ethanol amine is 2:1 to 10:1. We have found that a refined phospholipid, such as Nathin 135, Nathin 140 or Nathin 150 available from Nattermann Phospholipid, Inc. which are high in levels of phosphatidyl choline can be employed. These products are amber liquids which contain 35%, 40% and 50% phosphatidyl choline respectively. We prefer to employ as high a phosphatidyl choline content as possible in our fat replacers consistent with cost constraints. At least 35% and preferably from 40%-90% phosphatidyl choline can be used with 40-60% preferred.

In addition we have found that the ratio of phosphatidyl choline to phosphatidyl ethanolamine should be 2:1 to 10:1, preferably 2.5:1 to 10:1, most preferably 3:1 to 6:1. We also prefer to employ a phospholipid having a amount of phosphatidyl inositol of less than 3% and glycol lipids of less than 8%.

The Nathin 140 or equivalent phospholipid of high phosphatidyl choline content (40% or more) is combined with from 2 to 20 parts water with sufficient force and for a period of time sufficient to form globular vesicles or liposomes. Preferably from 4 to 16 parts of water is used per part of phospholipid with from 6 to 14 parts most preferred. The mixture consists of spherical vesicles that roll on the tongue and give a mouthfeel similar to that of fats. This material can be directly incorporated in all or a portion of the food to replace 40% to 60% or more of the fat present.

Liposomes may also be added per se as a coating or depanner in cooking and may be substituted for conventional carriers of flavors, vitamins and the like.

We have further found that the aqueous dispersion of globular vesicles or liposomes can be formed into a suspension or paste which can be directly substituted for all the fat in a food composition. This is accomplished by adding carbohydrate reinforcing agent to the aqueous dispersion to reinforce the vesicles or liposomes and give them body. We believe a complex is formed between the carbohydrate and liposome or vesicle which when substituted for all the fat in baked goods produces equal or superior products which use about a equal volume of material. It may be useful to employ a small amount of fat for its flavoring purposes in which case the food would be substantially fat free. We have also found that the higher the phosphatidyl choline content the lower the amount of complex necessary to replace the fat.

The carbohydrate reinforcing agents can include sugars, starches, gums, cellulose, and mixtures thereof.

The carbohydrate reinforcing material can be sugar, a hydrated or cooked starch, modified starch, hydrolyzed starch, water soluble or dispersible polysaccharides such as cellulose, pectinates, alginates, carragenan, seaweed polysaccharides and the like. The reinforcing material is added to the dispersion vesicles in an amount from 0.5 parts to 4 parts for each part of phospholipid, preferably 1.5 to 3 parts with about 2 parts usually sufficient where using Nathin 140 or Nathin 150. The carbohydrate reinforcing material is slowly added to the dispersion and mixed until a smooth paste is obtained. This paste is then stabilized, if desired, against microbiological degredation by using art known antimicrobial and antibacterial agents and other stabilizing agents.

We have found that mono and disaccharide may be employed to prevent or retard separation of the liposomes. The sugars may be used as all or part of the carbohydrate reinforcing material.

Suitable starches include starches which are soluble or when dispersed have swollen and have lost most of their birefringence. Soluble or modified starches or hydrocolloids are preferred. Such soluble and dispersed starches can be prepared from starches such as potato starch, rice starch, oat starch, corn starch, wheat starch, tapioca starch and the like.

Particularly preferred are enzymatically or chemically prepared malto-dextrins and pregelatinized starches. Examples of such materials are potato starch malto-dextrin having a DE up to 10 and pregelatinized wheat starch.

Suitable gums include: polysaccharides such as seaweed polysaccharides, pectinates, alginate, guar, carragenan, xanthan and the like. Most preferred is xanthan gum such as Rhodigel 200 available from Rhone Poulenc.

The reinforcing agent can also be cellulose or modified celluloses, malto-dextrins or fiber.

Combinations of the starch and gum as well as sugar are extremely useful allowing one to tailor make the properties of the liposome additive.

The reinforcing agent can be some of the ingredients used to formulate the conventional food. The fat replacer can be prepared using carbohydrate ingredients from the food formulations as the reinforcing agent. For example, where the food ingredient is used as the reinforcing agent to prepare the fat substitute a corresponding amount of that ingredient may then be left out of the food formulation during its preparation with the fat replacement composition of this invention.

The following examples are intended to illustrate various embodiments of the invention but are not intended to limit the invention in any way.

EXAMPLE 1

10 grams of Nathin 140 or Nathin 150 is placed in a the mixing bowl of a Hobart Mixer Model C100. The mixer is started and 90 grams of water is gradually added and mixed at medium speed until all the water is added. The mixer speed is then increased to high and mixed for 25 minutes until all the phospholipid is dissolved. When the mixture turns cloudy the vesicle liposome system is formed. We have found the ideal mixing speed should be 500-3000 RPM with the higher speed giving better results.

After the liposome system is formed, the mixer speed is reduced to medium speed and 20 gms of potato starch malto-dextrin is added ensuring no lumps are formed but that all the starch is distributed into the system. The mixer is then raised to high speed for 25 minutes. A thick, fat-like substance is formed which is refrigerated at 20°-40° F. for 2 hours. This blend can be used as a 100% substitute for fat.

EXAMPLE 2

50 grams of Nathin 150 is placed in an Osterizer® Dual Range Pulsmatic Model No. 16. About 100 cc of water is slowly added to the Osterizer® at medium speed to form cream. An additional 300 cc of water is then added to the cream and medium speed mixing is continued until all the ingredients have been homogenized. The container sides are thoroughly scrapped and the m blended at high speed till a creamy liquid emulsion is formed (approximately 20-30 minutes). Then 90 grams of potato starch malto-dextrin or modified wheat starch is added, scraping down the sides of the container at short intervals to make certain the starch is incorporated fully. Mix the combination at medium or high speed for 20 minutes or until a gel is formed. If some of the potato starch is not fully incorporated it can be mixed in with a spatula. The Osterizer® is run on high speed until a smooth creamy mixture is obtained. A thick fat-like substance is formed which can be used as a part or 100% substitute for fat.

EXAMPLE 3

A fat like food additive was prepared from nine parts phospholipid (Nathin 140 or 150), eighty-two parts water and nine parts pregelatinized wheat starch. The phospholipid is added to a Hobart mixing bowl and water added gradually into the mixing bowl while mixing with a paddle mixer for five minutes at low speed, five minutes at medium speed and five minutes at high speed until the liposome is formed. The pregelatinized wheat starch is then added to the multilamellar liposome system for two minutes at low speed, and then mixed for five minutes at medium speed and twenty minutes at the highest speed to form the fat replacement material.

EXAMPLE 4

A food additive is prepared from ten parts phospholipid having at least 40% phosphatidyl choline content, a ratio of at least 2:1 phosphatidyl choline to phosphatidyl ethanolamine, 87.5 parts water and 2.5 parts Rhodigel 200 (xanthan gum). The materials are mixed as in example 3 to give a fat replacement material.

Other high speed mixers or emulsifiers can be used to form the liposomes and final fat replacement materials. Flavors or other compatible food ingredients can be added to the liposome and the mixture then added to a foodstuff. We have also found the liposome may be used by itself as a fat replacer in some systems with adjustment of the water level. It may also be used as a depanning agent.

EXAMPLE 5

Bread is prepared using a conventional method and ingredients (control) and a variant (this invention) using fat replacer prepared in accordance with Example 1. Equal parts of the fat replacer were substituted for the fat. The proportions employed and processing conditions as well as the bread properties are listed in the following table.

| | VARIETY BREAD Base Formula | |
| --- | --- | --- |
| | Control | This Invention |
| Bread Flour | 77 g | 77 g |
| Wheat Gluten | 6 g | 6 g |

| VARIETY BREAD Base Formula | | |
|---|---|---|
| | Control | This Invention |
| Baker's Mix | 17 g | 17 g |
| Water | 63 g | 63 g |
| Compressed Yeast | 3 g | 3 g |
| Mineral Yeast Food | 0.5 g | — |
| Sugar | 7 g | 7 g |
| Honey | 2.5 g | 2.5 g |
| Molasses | 2.5 g | 2.5 g |
| Salt | 2 g | 2 g |
| Non fat Dry Milk | 3 g | 3 g |
| Dough Conditioner | 0.4 g | — |
| Shortening | 3.0 g | — |
| Fat Replacer | — | 3.0 |
| gLecicon Plus (lecithin based dough conditioner) | — | 0.5 g |
| Ascorbic Acid | — | .08 |
| Sponge Ferm. Time | 3 hrs | 3 hrs |
| Dough Ferm. Time | 10 min | 10 min |
| Proof Time | 59 min | 59 min |
| Loaf Weight | 461 gm | 469 gm |
| Loaf Volume | 2175 cc | 2500 cc |
| Specific Volume | 4.72 | 5.33 |

The dough of this invention was drier and had better machinability than the control.

A comparison of the breads indicate a more desirable loaf volume was obtained by use of the fat replacer. The bread made using fat replacer was very moist, tender and equivalent or better in texture than the control.

EXAMPLE 6

A yellow cake is prepared using conventional techniques and ingredients (control) and a variant (this invention) using the fat replacer prepared in accordance with Example 1. Equal parts of fat replacer and fat were used. Less egg yoke and water were necessary using the fat replacer. The cakes volume, texture and taste were equivalent for both control and variant.

| YELLOW LAYER CAKE | | |
|---|---|---|
| | Control | This Invention |
| Cake Flour | 236.3 gm | 236.3 gm |
| Granulated Sugar | 280.6 gm | 280.6 gm |
| Non Fatted Dry Milk | 18.3 gm | 18.3 gm |
| Dry Egg Yolk | 22.8 gm | — |
| Egg Yolk Replacer (fat free) | — | 10.0 gm |
| Dry Egg Whites | 9.10 gm | 9.10 gm |
| Salt | 6.5 gm | 6.5 gm |
| BL-60 | 5.6 gm | 5.6 gm |
| Soda Bicarbonate | 4.7 gm | 4.7 gm |
| Gelatinized Wheat Starch | 2.6 gm | 2.6 gm |
| CMC-7HF | 0.59 gm | 0.59 gm |
| Shortening | 63.1 gm | — |
| Fat Replacer | — | 63.1 gm |
| Emulsifier | 15.0 gm | 15.0 gm |
| Water-1st stage | 170 cc | 120 cc |
| Water-2nd stage | 160 cc | 154 cc |
| Batter Temperature | 68° C. | 68° C. |
| Batter Sp. Gravity | 0.81 | 0.83 |
| Cake Weight | 380 g. | 375 g. |
| Cake Volume | 1280 cc | 1230 cc |
| Spec. Volume | 3.37 | 3.28 |

Less water was required in the cake batter of this invention because of the water present in the fat replacer.

In summary, the fat replacer of this invention is demonstrated to produce food product equivalent to those containing equal amounts of fat. The finished cakes have improved softness and moistness.

What is claimed is:

1. A low fat or no fat foodstuff comprising a comestible and an edible fat replacer comprising liposome containing at least 5% phospholipid and water, said water to phospholipid presenting a ratio of 2:1 to 20:1, the phospholipid containing at least 35% phosphatidyl choline, said phospholipid having a phosphatidyl choline to phosphatidyl ethanolamine ratio of 2:1 to 10:1, the liposome further including an edible reinforcing material capable of stabilizing the liposome, said edible reinforcing material selected from the group consisting of starch, cellulose, gum and mixtures thereof wherein the ratio of edible reinforcing material to phospholipid is 0.5:1 to 4:1.

2. The foodstuff of claim 1 in which the phosphatidyl choline is present from about 40% to 90% and its ratio to phosphatidyl ethanolamine is 3:1 to 6:1.

3. A fat replacer comprising globular vesicles or liposomes of a phospholipid containing at least 35% phosphatidyl choline said phospholipid having a phosphatidyl choline to phosphatidyl ethanolamine ratio of 2:1 to 10:1, said liposomes suspended in water wherein the ratio of water to phospholipid is 2:1 to 20:1 and said phospholipid complexed with an edible reinforcing material selected from the group consisting of starch, gum, cellulose and mixtures thereof wherein the ratio of edible reinforcing material to phospholipid is 0.5:1 to 4:1.

4. The composition of claim 3 wherein the edible reinforcing material is potato malto-dextrin, pregelatinized wheat starch, xanthan gum and mixtures thereof.

5. A method for making a fat replacer comprising
mixing a refined phospholipid containing at least 35% phosphatidyl choline, said phospholipid having a phosphatidyl choline to phosphatidyl ethanolamine ratio of 2:1 to 10:1 and water, in which the ratio of water to phospholipid is from 2:1 to 20:1, for a sufficient time to form a homogeneous mixture of globular vesicles or liposomes in the water,
blending the homogeneous mixture with an edible reinforcing material wherein the ratio of edible reinforcing material to phospholipid is 0.5:1 to 4:1 and the reinforcing material is selected from the group consisting of a starch, gum, cellulose and mixtures thereof and is capable of forming a soft paste and
thoroughly mixing the blend until a uniform fat like material is obtained.

6. The method of claim 5 in which the phosphatidyl choline is present from about 40% of the phospholipid.

7. The method of claim 5 wherein the reinforcing material is starch malto-dextrin, pregelatinized starch, gum and mixtures thereof.

8. A method of preparing a low fat foodstuff comprising replacing at least 40% of the fat in the foodstuff with a composition comprising an aqueous mixture of vesicles or liposomes of a phospholipid containing at least 35% phosphatidyl choline, said phospholipid having a phosphatidyl choline to phosphatidyl ethanolamine ratio of 2:1 to 10:1 and wherein the ratio of water to phospholipid is from 2:1 to 10:1 and wherein the ratio of water to phospholipid is from 2:1 to 20:1, said phospholipid complexed with an edible reinforcing agent selected from the group consisting of starch, gum, and cellulose and mixtures thereof wherein the ratio of edible reinforcing material to phospholipid is 0.5:1 to 4:1.

9. The method of claim 8 in which the ratio of water to phospholipid is 6:1 to 14:1 and wherein the ratio of edible reinforcing material to phospholipid is 0.5:1 to 4:1 and the foodstuff is substantially fat free.

10. The method of claim 8 wherein the foodstuff is substantially fat free and the reinforcing material is starch malto-dextrin, pregelatinized starch, gum and mixtures thereof.

* * * * *

UNITED STATES PATENT AND TRADEMARK OFFICE
CERTIFICATE OF CORRECTION

PATENT NO.  : 5,120,561
DATED       : June 9, 1992
INVENTOR(S) : Roy F. Silva, et al.

It is certified that error appears in the above-identified patent and that said Letters Patent is hereby corrected as shown below:

Column 4, line 8:  "brea" should read as --bread--
    Column 6, line 10: "m blended" should read as --mixture is blended--
    Column 7, line 47: after "22.8 gm" insert -- — --
    Column 8, line 14, Claim 1: "cellulose, gum and" should read as --gum and cellulose--
    Column 8, line 23, Claim 4: delete "gum"

Signed and Sealed this

Twelfth Day of October, 1993

Attest:

BRUCE LEHMAN

*Attesting Officer*      *Commissioner of Patents and Trademarks*